Sept. 3, 1968 C. I. RITCHIE 3,399,874
FLUID BED HEATING AND COOLING APPARATUS
Filed Jan. 9, 1967 2 Sheets-Sheet 1

INVENTOR
CHARLES I. RITCHIE
BY Oberlin, Maky & Donnelly
ATTORNEYS

INVENTOR
CHARLES I. RITCHIE

United States Patent Office 3,399,874
Patented Sept. 3, 1968

3,399,874
FLUID BED HEATING AND COOLING APPARATUS
Charles I. Ritchie, Cleveland Heights, Ohio, assignor to Bangor Punta Operations, Inc., Bangor, Maine, a corporation of New York
Filed Jan. 9, 1967, Ser. No. 608,128
7 Claims. (Cl. 263—21)

ABSTRACT OF THE DISCLOSURE

A fluid bed apparatus for heating or cooling articles immersed therein, with the apparatus, when employed as a heater, including a gas-fired burner tube immersed within the fluid bed to improve the heat transfer to articles placed therein. The gaseous products of combustion of the burner tube are conveyed to a passage in the upper region of the apparatus for intimate commingling with the fluidizing gas and entrained organic fumes which may be provided by the heating of the immersed articles in the bed whereby any such organic fumes are incinerated prior to passage to the exhaust stack.

---

The present invention relates as indicated to fluid bed heating and cooling apparatus, and relates more particularly to an improved fluid bed apparatus for heating or cooling an article immersed therein.

The numerous advantages afforded by fluidized bed apparatus are becoming increasingly recognized. In such apparatus, a gaseous fluid under pressure is passed upwardly through the bed of finely divided solid material so as to produce continuous motion of the individual solid particles thereby to provide essentially continuous intimate contact of such particles with objects immersed within the fluid bed. Owing to this particular characteristic, the fluidized bed is an excellent heat exchange medium, with one such application being the heating of insulated electrical parts, for example rotors, stators and the like, to burn off or strip the organic insulating material, for example epoxy resin, therefrom.

Presently available fluid bed furnaces for the indicated purpose are characterized by their relatively large size and consequent rather high cost, thereby significantly restricting the potential users thereof. Secondly, in certain types of such furnaces the disposition of the organic fumes emanating with the fluidizing gas from the fluid bed has posed a problem, particularly in view of the increased efforts to combat air pollution. Still further, the entrainment of sand particles by the fluidizing gas has presented some difficulties in certain instances, with such entrained sand being either discharged from the apparatus or accumulated in bottom regions thereof, with either such result being undesirable.

With the above in mind, a primary object of the present invention is to provide a fluid bed furnace which is of relatively simple construction and which can be manufactured at relatively low cost.

A further object of the present invention is to provide such a fluid bed furnace wherein a gas burner tube is immersed within the fluid bed thereby to improve the heat exchange between the heating means and the fluidized bed.

Another object of the present invention is to provide a fluid bed furnace in which the gaseous products of combustion and the organic fumes entrained by a fluidizing gas are intimately commingled prior to passage to the exhaust stack thereby to provide substantially complete incineration of such fumes.

A still further object of the present invention is to provide means for returning to the fluidized bed any finely divided bed particles which may be entrained by the fluidizing gas emanating from the fluid bed, thereby preventing any such entrained particles from passing through the exhaust stack or accumulating in undesired areas in the apparatus.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figures 1, 2:
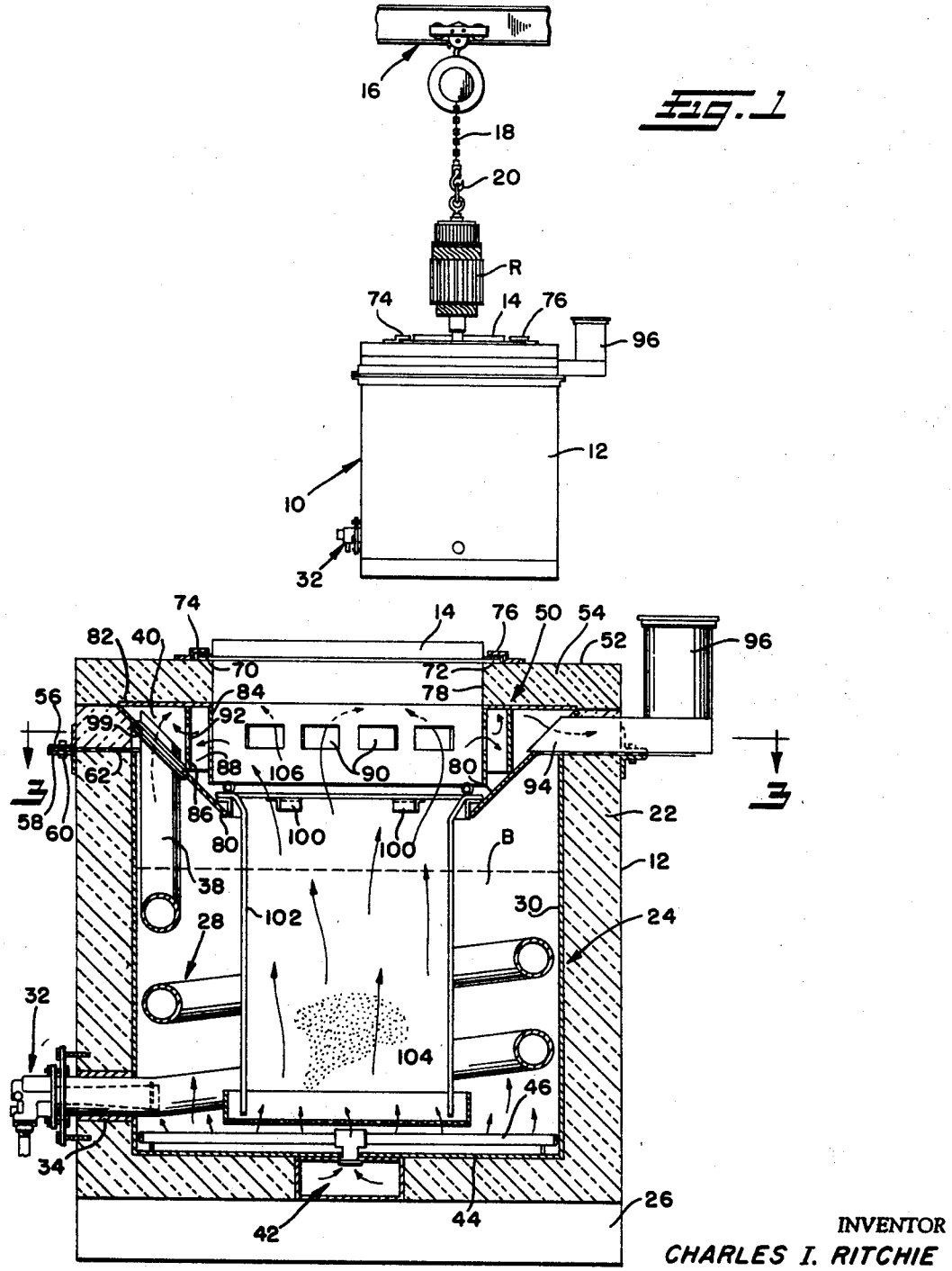
FIG. 1 is a side elevational view of the fluid bed furnace showing an article about to be placed therein.
FIG. 2 is an enlarged, vertical cross-sectional view of the furnace.

Referring now in more detail to the drawings, wherein like parts have been indicated by like reference numerals, and initially to FIG. 1, the fluid bed furnace of the present invention is generally indicated at 10 and comprises a cylindrical outer casing 12 and a cover 14. In the form shown, the cover 14 is rectangular in shape and is adapted for sliding movement between a position overlying and thus closing the top furnace opening and a withdrawn position exposing such top opening to permit lowering of an article to be treated to the fluid bed B, and for subsequently removing such article therefrom. Although the fluid bed furnace of the present invention has general utility, it is particularly well adapted, as above indicated, to the stripping of organic insulation from electrical parts or components, for example a rotor R having an exterior coating of epoxy resin. In the form shown, the rotor R is lowered to and removed from the fluid bed B by an overhead crane generally indicated at 16 which includes a chain 18 and a hook portion 20.

Figure 3:
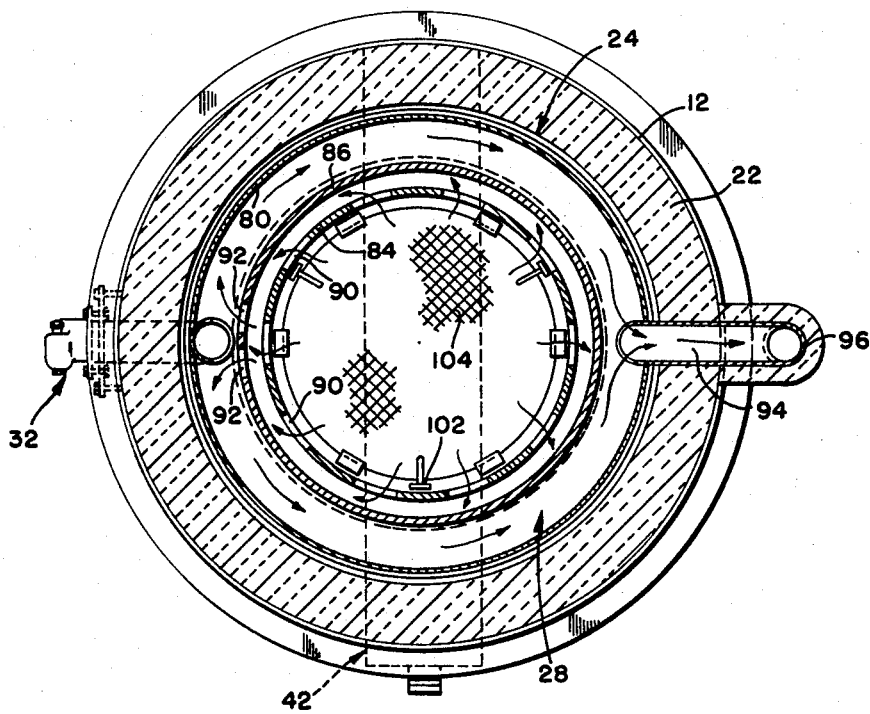
FIG. 3 is a horizontal cross-sectional view taken on line 3—3 of FIG. 2.

Referring now particularly to FIGS. 2 and 3, the furnace 10 further includes a layer of insulation 22 within the outer casing 12, with the vessel or retort generally indicated at 24 for containing the finely divided solid particles being positioned within the insulation 22. The outer shell 12 and insulation 22 are supported by a furnace base 26 of conventional construction.

A gas burner tube generally indicated at 28 and of generally convolute form is disposed in the fluid bed relatively adjacent the cylindrical side wall 30 of the vessel, with the lower end of the burner tube being operatively connected in sealed relation to a gas burner assembly generally indicated at 32. The latter includes a burner discharge end that extends into the adjacent end of the burner tube in known manner. The burner tube 28 is mounted in the side wall of the furnace by cylindrical packing 34 or the like. The gas burner assembly 32 is connected in a suitable manner to a source of metered fuel, normally natural gas, with combustion taking place well into the burner tube and the products of combustion passing upwardly therethrough. The burner tube 28 extends vertically through substantially the entire bed depth, with the upper end 38 thereof being vertically oriented and terminating in annular passageway 40 for commingling with the fluidizing gas after the same has passed upwardly through the fluid bed, as will be hereinafter described. The burner tube can if desired be supported intermediate the ends thereof by brackets or the like mounted on the vessel 30.

A fluidizer unit generally indicated at 42 is mounted within the insulation 22 directly beneath the bottom 44 of the vessel 24. Fluid under pressure entering the fluidizer 42 communicates with manifold pipes 46 mounted within the vessel 24 relatively adjacent the bottom thereof for fluidizing the bed B. The fluidizer 42 includes a threaded nipple end exterior of the furance and adapted to be connected to a suitable source of pressurized air.

The furnace 10 further includes a top frame section generally indicated at 50 comprising an outer shell or cover 52 and an insulation layer 54 therewithin. The top section 50 has mounted thereto a flange 56 which is adapted to overlie flange 58 suitably mounted on the lower frame of the furnace, the flanges being rigidly secured by mounting bolts 60. A sealing gasket 62 is provided for tightly sealing the connection.

As above noted, the cover 14 is of the sliding type and is provided with laterally extending flanges 70 and 72 at opposed sides thereof which are received in grooves formed by retaining brackets 74 and 76, respectively, carried by the top frame section 50, all in the well known manner. In this manner, the cover 14 can be quickly slidably moved to and from a position covering the central opening 78 formed in the top section 50.

An outwardly and upwardly inclined skirt 80 is supported by the upper frame section 50, with a top flange 82 being suitably secured to the upper end of the skirt and extending inwardly therefrom. A downwardly depending annular sleeve 84 is rigidly connected to the radially inner edge of the flange 82, with the lower end of the sleeve 84 terminating slightly above the skirt 80 relatively adjacent the inner end thereof. An annular baffle plate 86 is disposed radially outwardly of the sleeve 84 and connected at its opposite ends to the flange 82 and skirt 80 and forms with these members and the sleeve 84 an annular passageway 88.

The sleeve 84 is formed with a plurality of outlet openings commonly designated at 90 through which the fluidizing gas emanating from the fluid bed can pass into the annular passageway 88. The passageway 88 communicates with the previously described annular passage 40 through a pair of openings commonly designated at 92 formed in the member 86, which openings 92 are generally diametrically opposite outlet pipe 94 of exhaust stack 96. In this manner, the fluidizing gas and entrained organic fumes emanating from the fluid bed and passing through the several openings 90 formed in the sleeve 84 are forced to exit the passageway 88 only through such openings 92.

The vertically extending end 38 of the burner tube 28 extends through an opening 99 formed with skirt 80 into the passageway 40 relatively adjacent the openings 92 formed in the member 86. As a result, the fluidizing gas carrying the organic fumes produced during the heating of the insulated article immersed in the fluid bed commingles with the gaseous products of combustion emanating from the burner tube 28, with the thus commingled products traversing circumferentially approximately half the total circumferential distance of the passageway 40 thereby to substantially completely incinerate the organic fumes before the same reach the exhaust stack 96.

A plurality of generally L-shaped supporting brackets commonly designated at 100 are suitably secured to the skirt 80 adjacent the bottom thereof, with such brackets serving to releasably support a basket 102 in a manner illustrated in FIG. 2. The basket 102 can if desired support the article to be treated and includes a wire mesh bottom screen 104 adapted to receive any loose material stripped from the article during the stripping operation, thereby preventing such loose material from overlying and clogging the openings formed in the manifold pipes 46 through which the fluidizing gas passes for fluidizing the bed. The basket 102 can be readily removed after the stripping operation and emptied for immediate reuse.

As above indicated and as shown in FIG. 2, the bottom of the sleeve 84 terminates slightly above the skirt 80 thereby to define therewith an annular opening 106 through which previously entrained sand particles can be returned to the fluid bed. When the sand bed is fluidized, the velocity of the fluidizing gas, normally air, is such as to inherently entrain sand particles and carry the same upwardly out of the fluidized bed. Such entrained sand particles are carried by the fluidizing gas outwardly through the openings 90 into the passageway 88. Any such entrained sand particles passing outwardly through the several openings 90 will impinge upon the member 86 and be directed downwardly for contact with the skirt 80 and gravity return to the fluidized bed. Loss of sand from the fluidized bed is thus essentially completely eliminated thereby eliminating heretofore existing problems of exhaust product control and sand replenishment.

The normal operation of the fluid bed furnace above described should be apparent. The sand bed is fluidized and the basket 102 and article to be treated, for example a rotor R, are lowered, in that order, into the fluid bed, with the article being supported by the basket or by independent supporting means. The slidable cover 14 is then moved to a closed position and the burner assembly 32 is fired. The burner tube temperature can be relatively closely adjusted to provide desirable variations in fluid bed temperatures to accommodate the particular product being treated, with typical operating temperatures being in the range of 1400–1500° F. for the burner tube and 800–1000° F. for the fluid bed itself. At such elevated temperatures, the organic insulated coating on the rotor is relatively quickly burned off, with the organic fumes resulting from such decomposition being entrained by the fluidizing gas and passing upwardly out of the fluid bed. Owing to the continuous impinging action of the sand particles on the surface of the rotor R, the heat transfer to the insulated coating on the rotor R is significantly increased with the result that the insulation can be stripped in periods substantially less than heretofore possible in conventional radiation or convection ovens heretofore employed.

The fluidizing gas emanating from the fluid bed and the entrained organic fumes carried thereby are ultimately conveyed as described to the outer annular chamber 40 in the region thereof into which extends the upper end 38 of the burner tube 28. From such region, the gaseous products of combustion and the entrained organic fumes are intimately commingled in traversing the passageway 40 toward the exhaust outlet pipe 94 and stack 96, with the organic fumes thereby being subjected to considerably higher temperatures than the fluid bed itself thereby to substantially completely incinerate such fumes before reaching the exhaust duct 96. As a result, the gaseous products finally emanating from the exhaust stack 96 are essentially free of potential air pollutants.

Sand particles inherently entrained by the fluidizing gas are returned to the sand bed by means of the sleeve 84 and skirt 80, as above described, thereby maintaining the sand level essentially constant and eliminating the problem previously encountered of sand discharge through the exhaust stack.

It should be noted that the positioning of the burner tube 28 within the sand bed itself affords significant operating advantages. Initially, more efficient heat transfer to the fluid bed is realized. Secondly, by positioning the burner tube within the fluid bed, the unit can be substantially reduced in external dimension without, however, sacrificing significantly the volume of the fluid bed itself, with such relatively compact construction affording a corresponding saving in manufacturing costs.

In addition to the above described features of employing the gaseous products of combustion to incinerate the organic fumes, the use of gas to heat the bed has a further advantage. In fluidizing the sand bed, there is occasionally unvoidably produced in the sand bed certain areas where the fluidizing action is substantially less than in other regions of the bed, with the bed in certain instances actually becoming non-fluid in certain regions. With the submerged gas-fired burner tube in accordance with the present invention, such non-fluid conditions present no difficulty, as contrasted, for example, with submerged electrical heating units, such as calrods or the like, which are highly susceptible to damage or even failure when non-fluid bed conditions are encountered. When the sand particles are not in a fluidized state, they become tightly packed around the immersed electrical heating units and the insulated properties of the sand actually result in burning out of the electrical heating units if such nonfluid conditions remain.

Although the above description has been directed to apparatus for heating a fluidized bed, it will be obvious to one skilled in the art that essentially the same apparatus as disclosed, or with simplifying modification, can be used for cooling relatively hot articles immersed therein. In fact, units of the type above described are normally sold in pairs, one such unit being employed in a heating capacity and the second such unit being employed to cool the hot, stripped work product. It will be obvious that although the illustrated apparatus could be used in a cooling capacity in the exact form illustrated, the heating means can be eliminated and the insulation substantially reduced where the apparatus is specifically designed for cooling.

Other modes of applying the principle of the invention may be employed, change being made as regards the details described, provided the features stated in any of the following claims or the equivalent of such be employed.

I therefore particularly point out and distinctly claim as my invention:

1. A fluid bed furnace for treating articles immersed therein, comprising an outer casing, a vessel within said outer casing and insulated therefrom, said vessel containing a bed of finely divided solid material, cover means at the top of said casing for closing the same, means for supplying fluid under pressure to said bed of finely divided material for fluidizing the same, gas-fired burner tube means immersed in the fluidized bed and adapted to heat the same, exhaust outlet means for exhausing said fluid from said furnace after such fluid passes upwardly through said fluidized bed, and means for directing the gaseous products of combustion of said burner tube means to the upper region of said furnace above said bed for intimate commingling with the fluidizing gas, said fluidizing gas entraining therewith fumes produced in said furnace from articles treated therein thereby to effect substantially complete incineration of such fumes before the same are exhausted from said furnace.

2. The combination of claim 1 wherein said burner tube means is in convolute form mounted in said bed relatively adjacent the side wall of said vessel, the lower end of said tube means terminating relatively adjacent the bottom of said vessel and the upper end thereof extending vertically upwardly above said bed into the path of flow of said fluidizing gas and entrained fumes.

3. The combination of claim 2 wherein said exhaust outlet means comprises an annular exhaust passage relatively adjacent the top of said furnace, said passage communicating with an exhaust stack exteriorly of said furnace, said upper end of said burner tube means extending into said annular passage in the region thereof generally opposite said exhaust stack.

4. The combination of claim 1 wherein said exhaust outlet means comprises means defining a first annular passage for receiving fluidizing gas and entrained organic fumes, and means defining a second annular passage radially outwardly of said first passage and communicating directly with an exhaust stack exteriorly of said furnace, said burner tube means having an upper end portion extending vertically directly into said second passage in the region thereof generally opposite said exhaust stack for intimate commingling of said gaseous products of combustion and said organic fumes.

5. The combination of claim 4 wherein said first passage is defined by a vertically extending cylindrical sleeve, a vertically extending baffle plate spaced radially outwardly of said sleeve, and an upwardly and outwardly inclined skirt extending below said sleeve and said plate and defining the bottom of said passage, said skirt and said baffle plate functioning additionally to partially define said second passage, said baffle plate being imperforate except for openings formed therein generally opposite said exhaust stack thereby to confine the passage of gas and entrained organic fumes into said second passage only in the region of said burner tube means, said sleeve being formed with circumferentially spaced openings through which said gas and entrained fumes enter said first passage, any bed particles entrained by said gas impinging against said sleeve and being returned by gravity to said bed.

6. The combination of claim 1 further including means for returning particles of finely divided solid material entrained with said fluidizing gas to said bed.

7. The combination of claim 6 wherein said means for returning particles of finely divided solid material to said bed comprises a vertically extending baffle plate means and an upwardly and outwardly inclined skirt which cooperatively provide an annular surface down which particles impinging against said baffle plate can pass for return to said bed.

References Cited

UNITED STATES PATENTS 2,619,451   11/1952   Ogorfaly, et al.
3,250,521   5/1966   Sergent.

FREDERICK L. MATTESON, JR., *Primary Examiner.*

E. G. FAVORS, *Assistant Examiner.*